3,004,943
SYNTHETIC RUBBER LATEX
Robert W. Brown and Victor S. Chambers, Naugatuck, Conn., assignors to United States Rubber Company, New York, N.Y., a corporation of New Jersey
No Drawing. Filed Nov. 28, 1958, Ser. No. 776,765
16 Claims. (Cl. 260—29.7)

This invention relates to increasing the particle size of synthetic rubber latices, and particularly to permit them to be concentrated to fluid latices of high solids content.

It is known to reduce the pH of synthetic rubber latices containing soap emulsifiers whereby the soap partially reacts with the acidic material used to reduce the pH to produce free soap-forming acid, thereby destabilizing the system and causing agglomeration of the dispersed rubber particles into particles of larger size. The pH of the latex may be raised after such increase in particle size to improve the stability of the latex, and such restabilized latex of large particle size may be concentrated to fluid latices of high solids content.

We have found that the increase in particle size of a synthetic rubber latex containing soap on reduction of the pH of the latex is much greater if the pH is reduced in the presence of polyvinyl alcohol. Such latices on restabilization by raising the pH may readily be concentrated, preferably by evaporation concentration, to fluid high solids latices.

In carrying out the present invention, there is added to a synthetic rubber latex containing 2 to 10 parts of soap per 100 parts of latex solids and having a pH from 8 to 11 a small amount of polyvinyl alcohol, viz. 0.05% to 1% based on the weight of the latex solids. The pH of the latex is then reduced to within the range of 5.5 to 7.5 as by incorporating acidic material in the latex, i.e. material that produces hydrogen ions in aqueous medium, e.g. an acid such as carbon dioxide or formic acid or acetic acid, or a salt that hydrolyzes to form acid such as sodium silicofluoride, or an ammonium salt of a strong acid, such as ammonium chloride, and formaldehyde which reacts with the ammonia to form hexamethylenetetramine and liberates free hydrochloric acid. The pH of the latex is then increased to a pH of 8 to 11 as by the addition of ammonia or sodium or potassium hydroxide. The latex may be permitted to rest at room or elevated temperature after destabilization by lowering the pH and before raising the pH. The latex will conventionally have a solids content of 25% to 50%, and after the pH of the latex has been lowered to within the range of 5.5 to 7.5 in the presence of the polyvinyl alcohol and then raised to 8 to 11, the latex may be concentrated to a solids content of 55% to 70%, giving a fluid high solids latex. The latex may be concentrated by increasing the solids content in known manner as by creaming with a vegetable mucilage, such as ammonium alginate. It is preferred, however, to increase the solids content by evaporation concentration. The soaps in the latex from the polymerization, as is known, will be water-soluble soaps of soap-forming monocarboxylic acids, such as alkali-metal, ammonium and amine salts of higher fatty acids having 10 to 24 carbon atoms in the molecule or of rosin acids, including dehydrogenated, hydrogenated and disproportionated rosin acids. The latex may also contain other types of surface-active dispersing agents from the polymerization such as sulfonated or sulfated compounds having the general formula R—$SO_3M$ or R—$OSO_3M$, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde. Such sulfonated and sulfated dispersing agents may be added to the latex before reducing the pH according to the present invention to assure stability to the latex during particle size enlargement and on concentrating the latex.

Polyvinyl alcohols are generally graded by the viscosity in centipoises of a 4% solution of the polyvinyl alcohol in water at 20° C. Any of the conventional polyvinyl alcohols having a viscosity in 4% aqueous solution at 20° C. from 4 to 70 centipoises may be used in the present invention. An example of a commercial low viscosity type polyvinyl alcohol is one having a viscosity of 4 to 6 centipoises in 4% aqueous solution at 20° C. An example of a commercial medium viscosity type polyvinyl alcohol is one having a viscosity of 20 to 30 centipoises in 4% aqueous solution at 20° C. An example of a commercial high viscosity type polyvinyl alcohol is one having a viscosity of 45 to 70 centipoises in 4% aqueous solution at 20° C.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ether; methyl vinyl ketone; vinylidene chloride. Such a synthetic rubber latex may be termed a "butadiene polymer synthetic rubber latex."

The following examples illustrate the invention. All parts and percentages referred to herein are by weight.

*Example 1*

To 800 gm. samples of a latex of a synthetic rubber copolymer of 70 parts of butadiene-1,3 and 30 parts of styrene of 30% solids concentration containing 4.7 parts of potassium oleate soap emulsifying agent per 100 parts of latex solids and having a pH of 9.5 and an average particle diameter of 600 Angstrom units were added 2.4 gm. (1 part per 100 parts of latex solids) of a commercial dispersing agent which was the condensation product of sodium naphthalene sulfonate and formaldehyde as a 20% aqueous solution. Sample A was not otherwise compounded. To sample B was added 0.24 gm. of a low viscosity type polyvinyl alcohol (viscosity of 4 to 6 centipoises at 20° C.) dispersed in 4.8 gm. of water at 60°–70° C. To sample C was added 0.48 gm. of the same polyvinyl alcohol dispersed in 12 gm. of water at 60° C. to 70° C. Carbon dioxide was bubbled through latex samples A, B and C until the pH was lowered to 6.7. The latex samples were held at this pH of 6.7 for about 10 minutes, and then restabilized by raising the pH to 9.5 with 10% aqueous ammonia. The average particle diameter of samples A, B and C after lowering the pH and raising it again was 850, 2500 and 2750 Angstrom units, respectively, showing the great increase in particle size enlargement in the presence of the polyvinyl alcohol. Samples A, B and C after lowering the pH and raising it again were concentrated by evaporation concentration in a laboratory disc concentrator. Sample A coagulated during concentration. Sample B was concentrated to 58% solids content with a viscosity of 2100 centipoises. Sample C was concentrated to a solids content of 59% with a viscosity of 480 centipoises.

Example 2

To 830 gm. of a latex of a synthetic rubber copolymer of 63 parts of butadiene-1,3 and 37 parts of acrylonitrile of 24% solids concentration containing 1.5 parts of sodium oleate soap emulsifying agent and 3.5 parts of a dispersing agent which was the condensation product of sodium naphthalene sulfonate and formaldehyde per 100 parts of latex solids and having a pH of 9.8 and an average particle diameter of 640 Angstrom units was added 2 gm. of a condensation product of sodium naphthalene sulfonate and formaldehyde dispersing agent in 8 gm. of water and 0.4 gm. of a low viscosity type polyvinyl alcohol as in Example 1 dispersed in 7.6 gm. of water at about 66° C. Carbon dioxide was bubbled through the latex until the pH dropped to 6.5, whereupon the latex was restabilized by raising the pH to 8 to 9 with 10% aqueous ammonia. The average particle diameter had increased to 1850 Angstrom units. The latex was concentrated by evaporation concentration in a laboratory disc concentrator to 60.7% solids content with a viscosity of 960 centipoises.

Example 3

To 148 gm. samples of a latex of a synthetic rubber copolymer of 70 parts of butadiene-1,3 and 30 parts of styrene of 33.7% solids concentration containing 3.6 parts of potassium oleate soap emulsifying agent per 100 parts of latex solids and having a pH of 9.1 and an average particle diameter of 680 Angstrom units was added 0.5 gm. (1 part per 100 parts of latex solids) of a commercial dispersing agent which was the condensation product of sodium naphthalene sulfonate and formaldehyde as a 20% aqueous solution. Sample A was not otherwise compounded. To sample B, C, D and E were added 0.1 gm. (0.2 part per 100 parts of latex solids) of various types of polyvinyl alcohol (PVA) as 4% aqueous dispersions prepared at 60° C. to 70° C. To sample B was added a low viscosity type PVA having a viscosity of 4 to 6 centipoises in 4% aqueous solution at 20° C. To sample C was added a medium viscosity type PVA having a viscosity of 22 to 32 centipoises in 4% aqueous solution at 20° C. To samples D and E were added high viscosity types PVA having viscosities of 45 to 55 centipoises and 50 to 70 centipoises, respectively, in 4% aqueous solution at 20° C. Carbon dioxide was bubbled through the samples until the pH dropped to 6. The latices were held at this pH for about 5 minutes and then restabilized by raising the pH to 8 to 9 with 10% aqueous ammonia. The average particle diameter of the latices of samples A, B, C, D and E were 1000, 1360, 1260, 1470 and 1400 Angstrom units respectively.

Example 4

To 100 gm. samples of a latex of a synthetic rubber copolymer of 70 parts of butadiene-1,3 and 30 parts of styrene and 30% solids concentration containing 3.6 parts of potassium laurate soap emulsifying agent per 100 parts of latex solids and having a pH of 10.1 and an average particle diameter of 550 Angstrom units were added 2 parts per 100 parts of latex solids of a commercial dispersing agent which was the condensation product of sodium naphthalene sulfonate and formaldehyde as a 20% solution. Sample A was not otherwise compounded. To samples B, C, D and E was added 0.6, 0.8, 1.0 and 0.5 part of sodium silicofluoride, respectively as a 13% aqueous solution to reduce the pH to the range of 5.5 to 7.5. To sample E was also added 0.1 part of the polyvinyl alcohol used in Example 1. Latex samples A to E were held for 1 hour at 50° C., and the pH of the samples B to E was then raised to 9.5 by addition of 2% aqueous sodium hydroxide. The average particle diameter of samples A, B, C, D and E was 725, 750, 800, 900 and 2600 Angstrom units respectively.

The viscosity measurements of the latices in the above examples were made at approximately 25° C.

The temperature of treatment of the latex according to the present invention will generally be in the range from 0° C. to 100° C. The average particle diameter of latices to be treated according to the present invention may be from 500 to 1500 Angstrom units, and the average particle diameter of these latices may be increased by 200 to 2500 Angstrom units by the process of the present invention.

The latices of increased particle size according to the present invention, particularly of high solids content, may be used in the usual applications of latices, as in foam sponge manufacture, tire cord dipping, bonding and impregnating various materials, preparation of adhesives, and the like.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of mono-ethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises reducing the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11.

2. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of mono-ethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises incorporating in the latex material that produces hydrogen ions in aqueous medium, said material being in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11.

3. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of mono-ethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter adding ammonia to the latex in amount to increase the pH of the latex to within the range of 8 to 11.

4. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises adding sodium silicofluoride to the latex in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11.

5. The method of increasing the size of the dispersed polymer particles in a synthetic rubber latex of a copolymer of butadiene-1,3 and styrene containing 2 to 10 parts of a water-soluble soap of soap-forming monocarboxylic acid per 100 parts of latex solids and having a pH from 8 to 11 which comprises reducing the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11.

6. The method of increasing the size of the dispersed polymer particles in a synthetic rubber latex of a copolymer of butadiene-1,3 and styrene containing 2 to 10 parts of a water-soluble soap of soap-forming monocarboxylic acid per 100 parts of latex solids and having a pH from 8 to 11 which comprises incorporating in the latex material that produces hydrogen ions in aqueous medium, said material being in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11.

7. The method of increasing the size of the dispersed polymer particles in a synthetic rubber latex of a copolymer of butadiene-1,3 and styrene containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter adding ammonia to the latex in amount to increase the pH of the latex to within the range of 8 to 11.

8. The method of increasing the size of the dispersed polymer particles in a synthetic rubber latex of a copolymer of butadiene-1,3 and styrene containing 2 to 10 parts of a water-soluble soap of soap-forming monocarboxylic acid per 100 parts of latex solids and having a pH from 8 to 11 which comprises adding sodium silicofluoride to the latex in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11.

9. The method of increasing the size of the dispersed polymer particles in a synthetic rubber latex of a copolymer of butadiene-1,3 and acrylonitrile containing 2 to 10 parts of a water-soluble sooap of soap-forming monocarboxylic acid per 100 parts of latex solids and having a pH from 8 to 11 which comprises reducing the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11.

10. The method of increasing the size of the dispersed polymer particles in a synthetic rubber latex of a copolymer of butadiene-1,3 and acrylonitrile containing 2 to 10 parts of a water-soluble soap of soap-forming monocarboxylic acid per 100 parts of latex solids and having a pH from 8 to 11 which comprises incorporating in the latex material that produces hydrogen ions in aqueous medium, said material being in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11.

11. The method of increasing the size of the dispersed polymer particles in a synthetic rubber latex of a copolymer of butadiene-1,3 and acrylonitrile containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter adding ammonia to the latex in amount to increase the pH of the latex to within the range of 8 to 11.

12. The method of increasing the size of the dispersed polymer particles in a synthetic rubber latex of a copolymer of butadiene-1,3 and acrylonitrile containing 2 to 10 parts of a water-soluble soap of soap-forming monocarboxylic acid per 100 parts of latex solids and having a pH from 8 to 11 which comprises adding sodium silicofluoride to the latex in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11.

13. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 25% to 50%, and containing 2 to 10 parts of a water-soluble soap of a soap-forming carboxylic acid per 100 parts of latex solids and having a pH from 8 to 11 which comprises reducing the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11, and then increasing the solids content of the latex to within the range of 55% to 70%.

14. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 25% to 50%, and containing 2 to 10 parts of a water-soluble soap of a soap-forming carboxylic acid per 100 parts of latex solids and having a pH from 8 to 11 which comprises reducing the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter increasing the pH of the latex to within the range of 8 to 11, and then evaporating water from the latex until the latex is concentrated to a solids content of 55% to 70%.

15. The method of concentrating a synthetic rubber latex of a copolymer of butadiene-1,3 and styrene having a solids content of 25% to 50%, and containing 2 to 10 parts of a water-soluble soap of a soap-forming carboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter adding ammonia to the latex in amount to increase the pH of the latex to within the range of 8 to 11, and then evaporating water from the latex until the latex is concentrated to a solids content of 55% to 70%.

16. The method of concentrating a synthetic rubber latex of a copolymer of butadiene-1,3 and acrylonitrile having a solids content of 25% to 50%, and containing 2 to 10 parts of a water-soluble soap of a soap-forming carboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 1% of polyvinyl alcohol based on the weight of the latex solids, said polyvinyl alcohol having a viscosity in 4% aqueous solution at 20° C. from 4 to 70 centipoises, and thereafter adding ammonia to the latex in amount to increase the pH of the latex to within the range of 8 to 11, and then evaporating water from the latex until the latex is concentrated to a solids content of 55% to 70%.

References Cited in the file of this patent

UNITED STATES PATENTS

| | | |
|---|---|---|
| 2,357,861 | Willson | Sept. 12, 1944 |
| 2,548,802 | Linscott | Apr. 10, 1951 |
| 2,138,073 | Schweitzer | Nov. 29, 1953 |
| 2,839,483 | Howland | June 17, 1958 |